United States Patent
Sato et al.

(10) Patent No.: US 10,846,282 B2
(45) Date of Patent: Nov. 24, 2020

(54) BEHAVIOR CHARACTERISTIC AMOUNT ANALYSIS SYSTEM AND BEHAVIOR CHARACTERISTIC AMOUNT ANALYSIS METHOD

(71) Applicant: HITACHI INFORMATION & TELECOMMUNICATION ENGINEERING, LTD., Kanagawa (JP)

(72) Inventors: Nobuo Sato, Tokyo (JP); Akinori Asahara, Tokyo (JP)

(73) Assignee: HITACHI INFORMATION & TELECOMMUNICATION ENGINEERING, LTD., Kanagawa (JP)

( * ) Notice: Subject to any disclaimer, the term of this patent is extended or adjusted under 35 U.S.C. 154(b) by 181 days.

(21) Appl. No.: 16/313,744

(22) PCT Filed: Mar. 5, 2018

(86) PCT No.: PCT/JP2018/008243
§ 371 (c)(1),
(2) Date: Dec. 27, 2018

(87) PCT Pub. No.: WO2019/016997
PCT Pub. Date: Jan. 24, 2019

(65) Prior Publication Data
US 2020/0042511 A1    Feb. 6, 2020

(30) Foreign Application Priority Data

Jul. 21, 2017    (JP) .................................. 2017-141909

(51) Int. Cl.
*G06F 16/00*    (2019.01)
*G06F 16/23*    (2019.01)
(Continued)

(52) U.S. Cl.
CPC ........ *G06F 16/2365* (2019.01); *G06F 16/215* (2019.01); *G06F 16/2282* (2019.01)

(58) Field of Classification Search
CPC .... G06F 16/2282; G06F 16/215; G06F 16/22; G06F 16/2365
See application file for complete search history.

(56) References Cited

U.S. PATENT DOCUMENTS 10,564,639 B1 *  2/2020  Zhu .................... G05D 1/0248
2005/0071341 A1  3/2005  Chkodrov et al.
(Continued)

FOREIGN PATENT DOCUMENTS

JP    2005-108187 A    4/2005
JP    2011-123644 A    6/2011
(Continued)

OTHER PUBLICATIONS

Nikkei Digital Engineering, Nov. 15, 2001, No. 48, pp. 100-101.
Extended European Search Report dated Oct. 11, 2019 for the European Patent Application No. 18789313.6.

*Primary Examiner* — Cheryl Lewis
(74) *Attorney, Agent, or Firm* — Volpe Koenig

(57) ABSTRACT

In a behavior characteristic amount analysis system, a necessary storage capacity is saved and reduced upon a statistical process performed on a large amount of measured data from a sensor or the like and the analysis of characteristics of a target to be measured. A behavior characteristic amount analyzing server includes a central processing unit and a storage device. The storage device holds a sensor table group of sensor tables holding sensor data from the sensor, and a pivot table of pivot tables aggregated based on the sensor table group and one or a combination of the moving object, time, and a location. The central processing unit generates the pivot tables based on information of the sensor tables for each of predetermined time periods, causes the (Continued)

generated pivot tables to be stored in the storage device, and deletes the sensor tables used for the generation of the pivot tables.

8 Claims, 15 Drawing Sheets

(51) Int. Cl.
  *G06F 16/215* (2019.01)
  *G06F 16/22* (2019.01)

(56) References Cited

U.S. PATENT DOCUMENTS

| | | | |
|---|---|---|---|
| 2008/0009965 A1* | 1/2008 | Bruemmer | G06N 3/008 |
| | | | 700/245 |
| 2008/0009968 A1* | 1/2008 | Bruemmer | G06N 3/008 |
| | | | 700/245 |
| 2009/0210373 A1* | 8/2009 | Yu | A61B 5/1128 |
| | | | 706/47 |
| 2015/0032418 A1 | 1/2015 | Akiyama et al. | |
| 2016/0004971 A1 | 1/2016 | Verkasalo | |

FOREIGN PATENT DOCUMENTS

| | | |
|---|---|---|
| JP | 2014-164382 A | 9/2014 |
| JP | 2014-211803 A | 11/2014 |
| JP | 2015-26196 A | 2/2015 |
| JP | 2015-82117 A | 4/2015 |
| JP | 2015-212913 A | 11/2015 |

* cited by examiner

BASE STATION BEACON INSTALLATION TABLE TE01

| BASE STATION ID (TE0111) | TYPE (TE012) | X COORDINATE (TE013) | Y COORDINATE (TE014) | X-AXIS MEASUREMENT RANGE (TE015) | Y-AXIS MEASUREMENT RANGE (TE016) |
|---|---|---|---|---|---|
| BS-ID01 | LASER RADAR | 2 | 4 | 10m | 10m |
| BS-ID02 | LASER RADAR | 2 | 9 | 10m | 10m |
| BS-ID03 | LASER RADAR | 5 | 8 | 10m | 10m |
| BS-ID04 | LASER RADAR | 8 | 10 | 10m | 10m |
| BS-ID05 | LASER RADAR | 12 | 12 | 10m | 10m |
| : | : | : | : | : | : |
| BS-ID21 | CAMERA | 3 | 15 | 5m | 5m |
| BS-ID22 | CAMERA | 13 | 5 | 5m | 5m |
| : | : | : | : | : | : |
| BS-ID51 | BEACON | 10 | 12 | 1m | 1m |

FIG. 4

USER INFORMATION TABLE TE02

| SENSOR TAG ID (TE021) | NAME (TE022) | DEPART-MENT (TE023) | GENDER (TE024) | AGE (TE025) | NATION-ALITY (TE026) | MEMBER ID (TE027) | MAIL ADDRESS (TE028) |
|---|---|---|---|---|---|---|---|
| ST-ID21 | | | | | | | |
| ST-ID22 | | | | | | | |
| ST-ID23 | | | | | | | |
| ST-ID24 | | | | | | | |
| ST-ID25 | | | | | | | |

FIG. 5

SENSOR TABLE (LASER RADAR, SENSOR DATA) TE01

| BASE STATION ID (TM011) | TIME (TM012) | X COORDINATE (TM013) | Y COORDINATE (TM014) |
|---|---|---|---|
| BS-ID04 | 2015.08.21 19:45:00 000 | 9.1 | 8.2 |
| BS-ID06 | 2015.08.21 19:45:00 000 | 8.9 | 8.1 |
| BS-ID04 | 2015.08.21 19:45:00 001 | 9.1 | 8.2 |
| BS-ID06 | 2015.08.21 19:45:00 001 | 8.8 | 8.0 |
| BS-ID04 | 2015.08.21 19:45:00 002 | 9.2 | 8.3 |
| BS-ID06 | 2015.08.21 19:45:00 002 | 8.7 | 8.1 |
| BS-ID04 | 2015.08.21 19:45:00 003 | 9.3 | 7.9 |
| BS-ID06 | 2015.08.21 19:45:00 003 | 8.2 | 8.0 |
| : | : | : | : |

FIG. 6
SENSOR TABLE (LASER RADAR, TRAJECTORY DATA) TM02

| OBJECT ID (TM021) | START TIME (TM022) | X COORDINATE OF START POINT (TM023) | Y COORDINATE OF START POINT (TM024) | END TIME (TM025) | X COORDINATE OF END POINT (TM026) | Y COORDINATE OF END POINT (TM027) | SPEED (TM028) | SIZE (TM029) |
|---|---|---|---|---|---|---|---|---|
| ID0001-1 | 2014.08.21 19:45:00 000 | 9 | 8 | 2014.08.21 19:45:01 000 | 10 | 8 | 0.10 | 0.08 |
| ID0002-1 | 2014.08.21 19:45:00 000 | 9 | 8 | 2014.08.21 19:45:01 000 | 10 | 8 | 0.10 | 0.08 |
| ID0003-1 | 2014.08.21 19:45:00 000 | 10 | 8 | 2014.08.21 19:45:01 000 | 11 | 8 | 0.10 | 0.08 |
| ID0004-1 | 2014.08.21 19:45:00 000 | 9 | 8 | 2014.08.21 19:45:01 000 | 10 | 8 | 0.10 | 0.08 |
| ID0005-1 | 2014.08.21 19:45:00 000 | 9 | 8 | 2014.08.21 19:45:01 000 | 10 | 8 | 0.10 | 0.08 |
| ID0001-2 | 2014.08.21 19:45:01 000 | 10 | 8 | 2014.08.21 19:45:02 000 | 11 | 8 | 0.10 | 0.08 |
| ID0002-2 | 2014.08.21 19:45:01 000 | 10 | 8 | 2014.08.21 19:45:02 000 | 11 | 8 | 0.10 | 0.08 |
| ID0003-2 | 2014.08.21 19:45:01 000 | 11 | 8 | 2014.08.21 19:45:02 000 | 12 | 8 | 0.10 | 0.08 |
| : | : | : | : | : | : | : | : | : |

FIG. 7
SENSOR TABLE (CAMERA, SENSOR DATA) TM03

| BASE STATION ID (TM031) | TIME (TM032) | IMAGE (TM033) |
|---|---|---|
| BS-ID21 | 2015.08.21 19:45:00 000 | BS-ID21_00001.png |
| BS-ID22 | 2015.08.21 19:45:00 000 | BS-ID22_00001.png |
| BS-ID21 | 2015.08.21 19:45:00 001 | BS-ID21_00002.png |
| BS-ID22 | 2015.08.21 19:45:00 001 | BS-ID22_00002.png |
| BS-ID21 | 2015.08.21 19:45:00 002 | BS-ID21_00003.png |
| BS-ID22 | 2015.08.21 19:45:00 002 | BS-ID22_00003.png |
| BS-ID21 | 2015.08.21 19:45:00 003 | BS-ID21_00004.png |
| BS-ID22 | 2015.08.21 19:45:00 003 | BS-ID22_00004.png |
| : | : | : |

FIG. 8
SENSOR TABLE (CAMERA, TRAJECTORY DATA) TM04

| OBJECT ID (TM041) | START TIME (TM042) | X COORDINATE OF START POINT (TM043) | Y COORDINATE OF START POINT (TM044) | END TIME (TM045) | X COORDINATE OF END POINT (TM046) | Y COORDINATE OF END POINT (TM047) | EMOTION (TM048) | BEHAVIOR (TM049) | GENERATION (TM0410) | GENDER (TM0411) | BELONGINGS (TM0412) |
|---|---|---|---|---|---|---|---|---|---|---|---|
| ID0001-1 | 2014.08.21 19:45:00 000 | 9 | 8 | 2014.08.21 19:45:01 000 | 10 | 8 | | | | | |
| ID0002-1 | 2014.08.21 19:45:00 000 | 9 | 8 | 2014.08.21 19:45:01 000 | 10 | 8 | | | | | |
| ID0003-1 | 2014.08.21 19:45:00 000 | 10 | 8 | 2014.08.21 19:45:01 000 | 11 | 8 | | | | | |
| ID0004-1 | 2014.08.21 19:45:00 000 | 9 | 8 | 2014.08.21 19:45:01 000 | 10 | 8 | | | | | |
| ID0005-1 | 2014.08.21 19:45:00 000 | 9 | 8 | 2014.08.21 19:45:01 000 | 10 | 8 | | | | | |
| ID0001-2 | 2014.08.21 19:45:01 000 | 10 | 8 | 2014.08.21 19:45:02 000 | 11 | 8 | | | | | |
| ID0002-2 | 2014.08.21 19:45:01 000 | 10 | 8 | 2014.08.21 19:45:02 000 | 11 | 8 | | | | | |
| ID0003-2 | 2014.08.21 19:45:01 000 | 11 | 8 | 2014.08.21 19:45:02 000 | 12 | 8 | | | | | |
| : | : | : | : | : | : | : | : | : | : | : | : |

FIG. 9
SENSOR TABLE (SENSOR TAGS, SENSOR DATA) TM05

| SENSOR TAG ID (TM051) | TIME (TM052) | ACCELERATION (TM053) | TEMPERATURE (TM054) | ILLUMINANCE (TM055) | OPPOSING SURFACE (TM056) | AUDIO (TM057) | LOCATION (TM058) |
|---|---|---|---|---|---|---|---|
| ST-ID21 | 2015.08.21 19:45:00 000 | | | | | | |
| ST-ID22 | 2015.08.21 19:45:00 000 | | | | | | |
| ST-ID21 | 2015.08.21 19:45:00 001 | | | | | | |
| ST-ID22 | 2015.08.21 19:45:00 001 | | | | | | |
| ST-ID21 | 2015.08.21 19:45:00 002 | | | | | | |
| ST-ID22 | 2015.08.21 19:45:00 002 | | | | | | |
| ST-ID21 | 2015.08.21 19:45:00 003 | | | | | | |
| ST-ID22 | 2015.08.21 19:45:00 003 | | | | | | |
| : | : | : | : | : | : | : | : |

FIG. 10

SENSOR TABLE (SENSOR TAGS, TRAJECTORY DATA) TM06

| SENSOR TAG ID (TM061) | START TIME (TM062) | X COORDINATE OF START POINT (TM063) | Y COORDINATE OF START POINT (TM064) | END TIME (TM065) | X COORDINATE OF END POINT (TM066) | Y COORDINATE OF END POINT (TM067) | SPEED [m/s] (TM068) | SIZE [m²] (TM069) | BEHAVIOR (TM0610) | OTHER PERSON (TM0611) | LOCATION (TM0612) |
|---|---|---|---|---|---|---|---|---|---|---|---|
| ST-ID21 | 2014.08.21 19:45:00 000 | 9 | 8 | 2014.08.21 19:45:01 000 | 10 | 8 | 0.10 | 0.08 | | | |
| ST-ID22 | 2014.08.21 19:45:00 000 | 9 | 8 | 2014.08.21 19:45:01 000 | 10 | 8 | 0.10 | 0.08 | | | |
| ST-ID23 | 2014.08.21 19:45:00 000 | 10 | 8 | 2014.08.21 19:45:01 000 | 11 | 8 | 0.10 | 0.08 | | | |
| ST-ID24 | 2014.08.21 19:45:00 000 | 9 | 8 | 2014.08.21 19:45:01 000 | 10 | 8 | 0.10 | 0.08 | | | |
| ST-ID25 | 2014.08.21 19:45:00 000 | 9 | 8 | 2014.08.21 19:45:01 000 | 10 | 8 | 0.10 | 0.08 | | | |
| ST-ID21 | 2014.08.21 19:45:01 000 | 10 | 8 | 2014.08.21 19:45:02 000 | 11 | 8 | 0.10 | 0.08 | | | |
| ST-ID22 | 2014.08.21 19:45:01 000 | 10 | 8 | 2014.08.21 19:45:02 000 | 11 | 8 | 0.10 | 0.08 | | | |
| ST-ID23 | 2014.08.21 19:45:01 000 | 11 | 8 | 2014.08.21 19:45:02 000 | 12 | 8 | 0.10 | 0.08 | | | |
| ⋮ | ⋮ | ⋮ | ⋮ | ⋮ | ⋮ | ⋮ | ⋮ | ⋮ | ⋮ | ⋮ | ⋮ |

FIG. 11

PIVOT MANAGEMENT TABLE TL01

| MANAGEMENT ID (TL011) | START TIME (TL012) | END TIME (TL013) | TARGET START TIME AND DATE (TL014) | TARGET END TIME AND DATE (TL015) | COMPLETED PROCESS RANGE (TL016) | PIVOT ID (TL017) |
|---|---|---|---|---|---|---|
| PM-ID01 | | | | | ALL | TP-ID01 |
| PM-ID02 | | | | | | SP-ID02 |
| PM-ID03 | | | | | | |
| PM-ID04 | | | | | | |
| PM-ID05 | | | | | | |

FIG. 12

PIVOT TABLE (PERSON PIVOTS) TP01

| PERSON PIVOT ID (TP011) | PERSON ATTRIBUTE (TP012) | APPEAR -ANCE TIME (TP013) | DISAPPEAR -ANCE TIME (TP014) | EXISTENCE TIME PERIOD (SECONDS) (TP015) | CUMULATIVE MOVEMENT DISTANCE (TP016) | DISTANCE BETWEEN START AND END POINTS (TP017) | AVERAGE SPEED (TP018) |
|---|---|---|---|---|---|---|---|
| PP-ID01 | ALL PEOPLE | | | | | | |
| PP-ID02 | MALE | | | | | | |
| PP-ID03 | FEMALE | | | | | | |
| PP-ID04 | | | | | | | |
| PP-ID05 | | | | | | | |

FIG. 13

PIVOT TABLE (TIME PIVOTS) TP02

| TIME PIVOT ID (TP021) | TIME (TP022) | TIME AGGREGATION UNIT (TP023) | NUMBER OF VISITING PERSONS (TP024) | AVERAGE SPEED (TP025) | CONGESTION RATE (TP026) | MAXIMUM NUMBER OF SIMULTANEOUSLY STAYING PERSONS (TP027) |
|---|---|---|---|---|---|---|
| TP-ID01 | | | | | | |
| TP-ID02 | | | | | | |
| TP-ID03 | | | | | | |
| TP-ID04 | | | | | | |
| TP-ID05 | | | | | | |

FIG. 14

PIVOT TABLE (LOCATION PIVOTS) TP03

| LOCATION PIVOT ID (TP031) | COORDI -NATES (TP032) | LOCATION AGGREGATION UNIT (TP033) | NUMBER OF VISITING PERSONS (TP034) | AVERAGE SPEED (TP035) | CONGESTION RATE (TP036) | MAXIMUM NUMBER OF SIMULTANEOUSLY STAYING PERSONS (TP037) |
|---|---|---|---|---|---|---|
| SP-ID01 | | | | | | |
| SP-ID02 | | | | | | |
| SP-ID03 | | | | | | |
| SP-ID04 | | | | | | |
| SP-ID05 | | | | | | |

FIG. 15
PIVOT TABLE (TIME AND PERSON PIVOTS) TP04

| TIME AND PERSON PIVOT ID (TP041) | TIME (TP042) | TIME AGGREGATION UNIT (TP043) | PERSON ATTRIBUTE (TP044) | AVERAGE SPEED (TP045) | CONGESTION RATE (TP046) | EXISTENCE TIME PERIOD (SECONDS) (TP047) |
|---|---|---|---|---|---|---|
| TPP-ID01 | | | ALL PEOPLE | | | |
| TPP-ID02 | | | CHILDREN | | | |
| TPP-ID03 | | | ADULT MALE | | | |
| TPP-ID04 | | | ADULT FEMALE | | | |
| TPP-ID05 | | | | | | |
| | | | | | | |

FIG. 16
PIVOT TABLE (LOCATION AND PERSON PIVOTS) TP05

| LOCATION AND PERSON PIVOT ID (TP051) | COORDI-NATES (TP052) | LOCATION AGGREGATION UNIT (TP053) | PERSON ATTRIBUTE (TP054) | AVERAGE SPEED (TP055) | CONGESTION RATE (TP056) | EXISTENCE TIME PERIOD (SECONDS) (TP057) |
|---|---|---|---|---|---|---|
| SPP-ID01 | | | ALL PEOPLE | | | |
| SPP-ID02 | | | CHILDREN | | | |
| SPP-ID03 | | | ADULT MALE | | | |
| SPP-ID04 | | | ADULT FEMALE | | | |
| SPP-ID05 | | | | | | |
| | | | | | | |

FIG. 17
PIVOT TABLE (LOCATION AND TIME PIVOTS) TP06

| LOCATION AND TIME PIVOT ID (TP061) | COORDI-NATES (TP062) | LOCATION AGGREGATION UNIT (TP063) | TIME (TP064) | TIME AGGREGATION UNIT (TP065) | AVERAGE SPEED (TP066) | CONGESTION RATE (TP067) | EXISTENCE TIME PERIOD (SECONDS) (TP068) |
|---|---|---|---|---|---|---|---|
| STP-ID01 | | | | | | | |
| STP-ID02 | | | | | | | |
| STP-ID03 | | | | | | | |
| STP-ID04 | | | | | | | |
| STP-ID05 | | | | | | | |
| | | | | | | | |

FIG. 18

PIVOT TABLE (LOCATION, TIME, AND PERSON PIVOTS) TP07

| LOCATION, TIME, AND PERSON PIVOT ID (TP071) | COORDI-NATES (TP072) | LOCATION AGGREGATION UNIT (TP073) | TIME (TP074) | TIME AGGREGATION UNIT (TP075) | PERSON ATTRIBUTE (TP074) | AVERAGE SPEED (TP076) | CONGESTION RATE (TP077) | EXISTENCE TIME PERIOD (SECONDS) (TP078) |
|---|---|---|---|---|---|---|---|---|
| STPP-ID01 | | | | | ALL PEOPLE | | | |
| STPP-ID02 | | | | | CHILDREN | | | |
| STPP-ID03 | | | | | ADULT MALE | | | |
| STPP-ID04 | | | | | ADULT FEMALE | | | |
| STPP-ID05 | | | | | | | | |
| | | | | | | | | |
| | | | | | | | | |
| | | | | | | | | |

FIG. 19

CHARACTERISTIC AMOUNT TABLE TP01

| PROCESS ID (TC011) | TARGET START TIME AND DATE (TC012) | TARGET END TIME AND DATE (TC013) | CHARACTERISTIC AMOUNT NAME (TC014) | LOCATION AGGREGATION UNIT (TC015) | CHARACTERISTIC AMOUNT (TC016) | START TIME OF PROCESS (TC017) | START TIME OF PROCESS (TC018) | PROCESS SUCCESS FLAG (TC019) |
|---|---|---|---|---|---|---|---|---|
| PS-ID01 | | | CONGESTION RATE | area01 | 9:05 | | | |
| PS-ID02 | | | CONGESTION RATE | area01 | 9:10 | | | |
| PS-ID03 | | | CONGESTION RATE | area02 | 9:05 | | | |
| PS-ID04 | | | CONGESTION RATE | area02 | 9:10 | | | |
| PS-ID05 | | | | | | | | |
| | | | | | | | | |
| | | | | | | | | |
| | | | | | | | | |

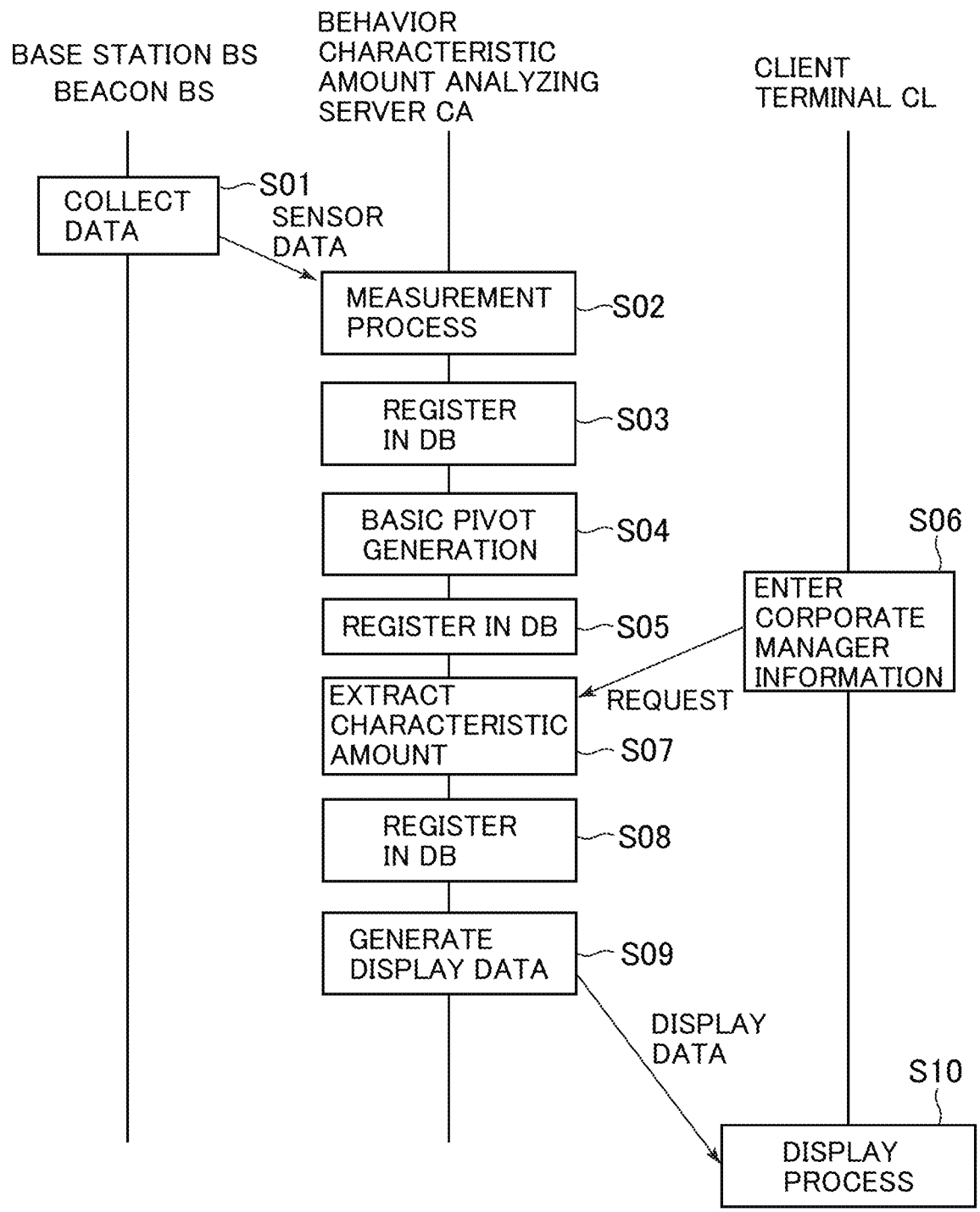

FIG. 24
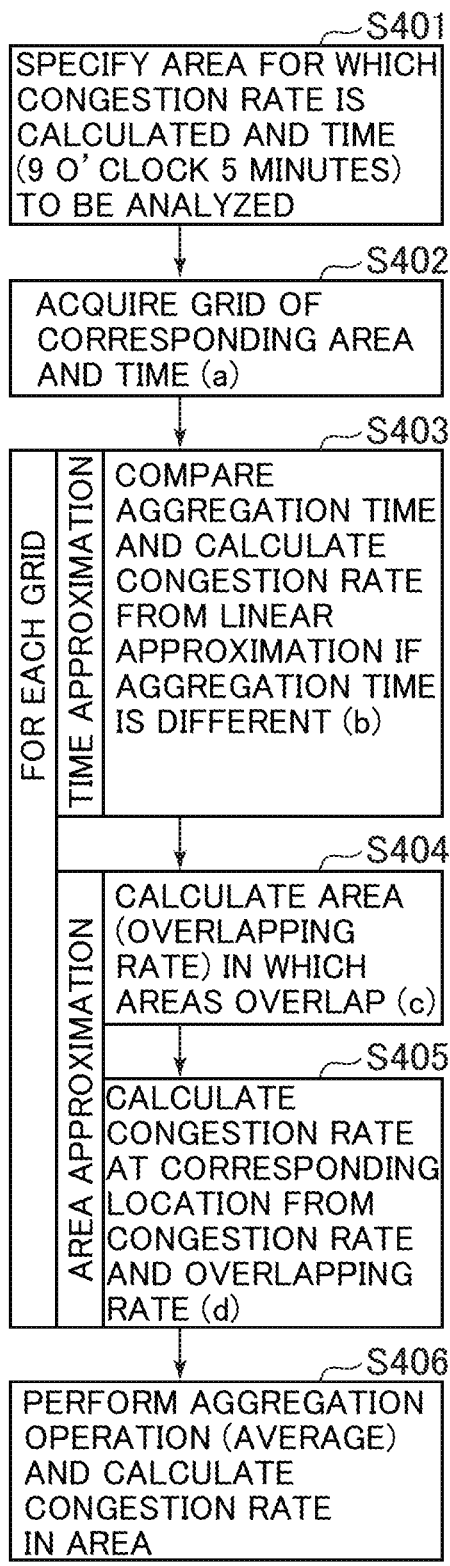
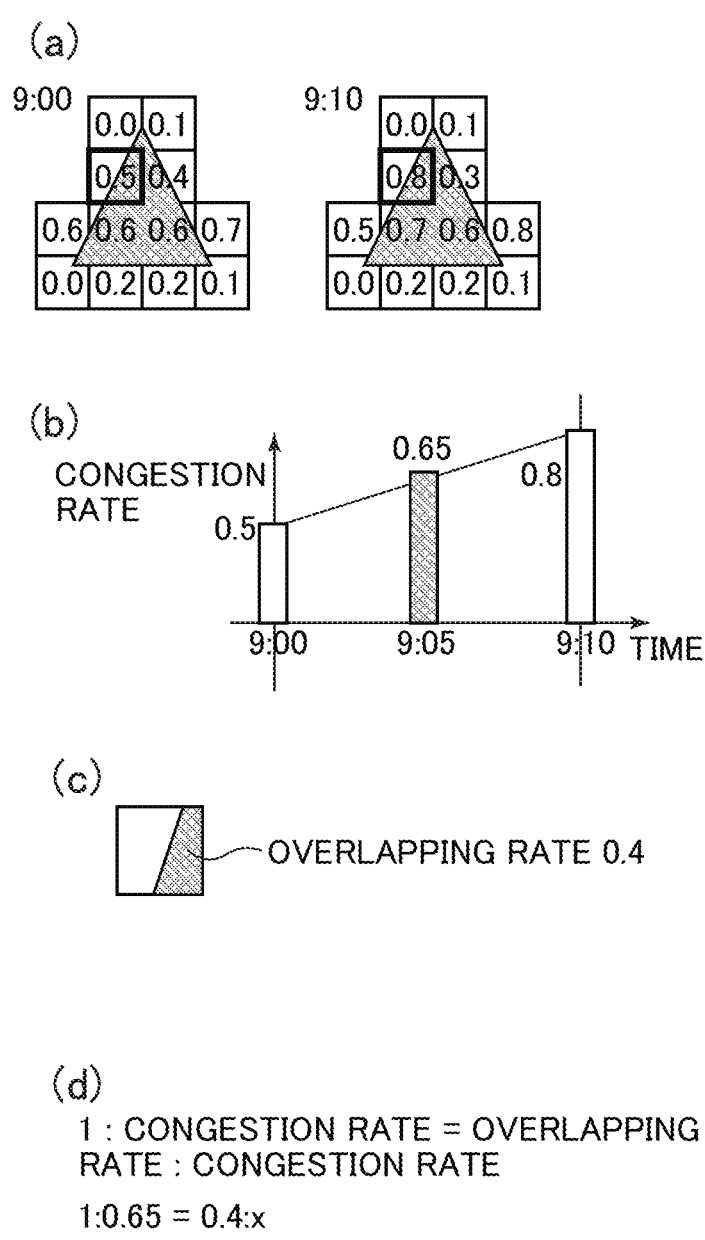

BEHAVIOR CHARACTERISTIC AMOUNT ANALYSIS SYSTEM AND BEHAVIOR CHARACTERISTIC AMOUNT ANALYSIS METHOD

TECHNICAL FIELD

The present technique relates to a behavior characteristic amount analysis system and a behavior characteristic amount analysis method and more particularly to a behavior characteristic amount analysis system and a behavior characteristic amount analysis method, which are suitable to save and reduce a necessary storage capacity upon a statistical process performed on a large amount of measured data from a sensor or the like and the analysis of characteristics of a target to be measured.

BACKGROUND ART

A technique for detecting a person is generally used, which scans a surrounding of a device with the device using infrared laser light (laser radar), a camera, or the like and uses a device for measuring the position of an object existing in the surrounding. In addition, a technique for detecting a person by extracting a facial region from an image captured by a camera is also used. Furthermore, in recent years, there has been a technique for detecting the position of a person by installing a beacon in a space, attaching a sensor tag to the person, and causing the sensor tag to detect the beacon. These sensor devices generate a large amount of sensor data. Since all the sensor data needs to be stored to perform past calculation and analysis, there is a problem that the cost of storage for storing the sensor data is large.

To save and reduce the storage capacity for storing the data, there is a method for deleting sensor data upon the end of an event such as data migration, as described in Patent Literature 1, for example. In Patent Literature 1, classification and selection are performed before data accumulation, a chunk is generated in a sectioned storage region, and the generated data is deleted from an information holding unit.

In addition, to facilitate the past calculation and the analysis, a method for generating a pivot table (pivot table) is disclosed in Patent Literature 2, for example.

CITATION LIST

Patent Literature

Patent Literature 1: Japanese Unexamined Patent Application Publication No. 2014-164382
Patent Literature 2: Japanese Unexamined Patent Application Publication No. 2015-82117

SUMMARY OF INVENTION

Technical Problem

If sensor data within storage is deleted upon the migration of data from the storage to another medium, the cost of the storage can be reduced. However, data during a time period corresponding to the deleted data may be required for past calculation in a certain case. For the technique described in Patent Literature 1, the idea of handling the case is not considered.

On the other hand, in a technique described in Patent Literature 2, since a pivot table is generated, the pivot table can be used for past calculation and analysis. However, since the pivot table and sensor data are held, the cost of storage for holding those data is large. Thus, for the technique described in Patent Literature 2, the idea of saving and reducing a storage capacity while enabling past calculation and analysis is not considered.

An object of the present invention is to provide a behavior characteristic amount analysis system that can save and reduce a necessary storage capacity upon a statistical process performed on a large amount of measured data from a sensor or the like and the analysis of characteristics of a target to be measured.

Solution to Problem

A behavior characteristic amount analysis system according to the present invention is a behavior characteristic amount analysis system that analyzes sensor data input from a sensor and outputs a characteristic amount of a behavior related to a moving object. The behavior characteristic amount analysis system includes a behavior characteristic amount analyzing server. The behavior characteristic amount analyzing server includes a central processing unit and a storage device. The storage device holds a sensor table group of sensor tables holding sensor data from the sensor, and a pivot table of pivot tables aggregated based on the sensor table group and one or a combination of a moving object, time, and a location. The central processing unit generates the pivot tables based on information of the sensor tables for each of predetermined time periods, causes the generated pivot tables to be stored in the storage device, and deletes the sensor tables used for the generation of the pivot tables.

Advantageous Effects of Invention

According to the present invention, a behavior characteristic amount analysis system that can save and reduce a necessary storage capacity upon a statistical process performed on a large amount of measured data from a sensor or the like and the analysis of characteristics of a target to be measured can be provided.

BRIEF DESCRIPTION OF DRAWINGS

FIG. 4 is a diagram showing an example of a user information table.
FIG. 5 is a diagram showing an example of a sensor table (laser radar, sensor data).
FIG. 6 is a diagram showing an example of a sensor table (laser radar, trajectory data).
FIG. 7 is a diagram showing an example of a sensor table (camera, sensor data).
FIG. 8 is a diagram showing an example of a sensor table (camera, trajectory data).
FIG. 9 is a diagram showing an example of a sensor table (sensor tags, sensor data).
FIG. 10 is a diagram showing an example of a sensor table (sensor tags, trajectory data).
FIG. 11 is a diagram showing an example of a pivot management table.

FIG. 12 is a diagram showing an example of a pivot table (person pivots).

FIG. 13 is a diagram showing an example of a pivot table (time pivots).

FIG. 14 is a diagram showing an example of a pivot table (location pivots).

FIG. 15 is a diagram showing an example of a pivot table (time and person pivots).

FIG. 16 is a diagram showing an example of a pivot table (location and person pivots).

FIG. 17 is a diagram showing an example of a pivot table (location and time pivots).

FIG. 18 is a diagram showing an example of a pivot table (location, time, and person pivots).

FIG. 19 is a diagram showing an example of a characteristic amount table.

FIG. 20 is a sequence diagram showing an overview of a process of the behavior characteristic amount analysis system.

FIG. 24 is a diagram describing an example of the process of generating an approximate characteristic amount.

DESCRIPTION OF EMBODIMENT

Hereinafter, an embodiment of the present invention is described using FIGS. 1 to 25.

The embodiment describes, as an example of a behavior characteristic amount analysis system, an example of a trajectory extraction system that visualizes how many people stay in a facility.

Figure 1:
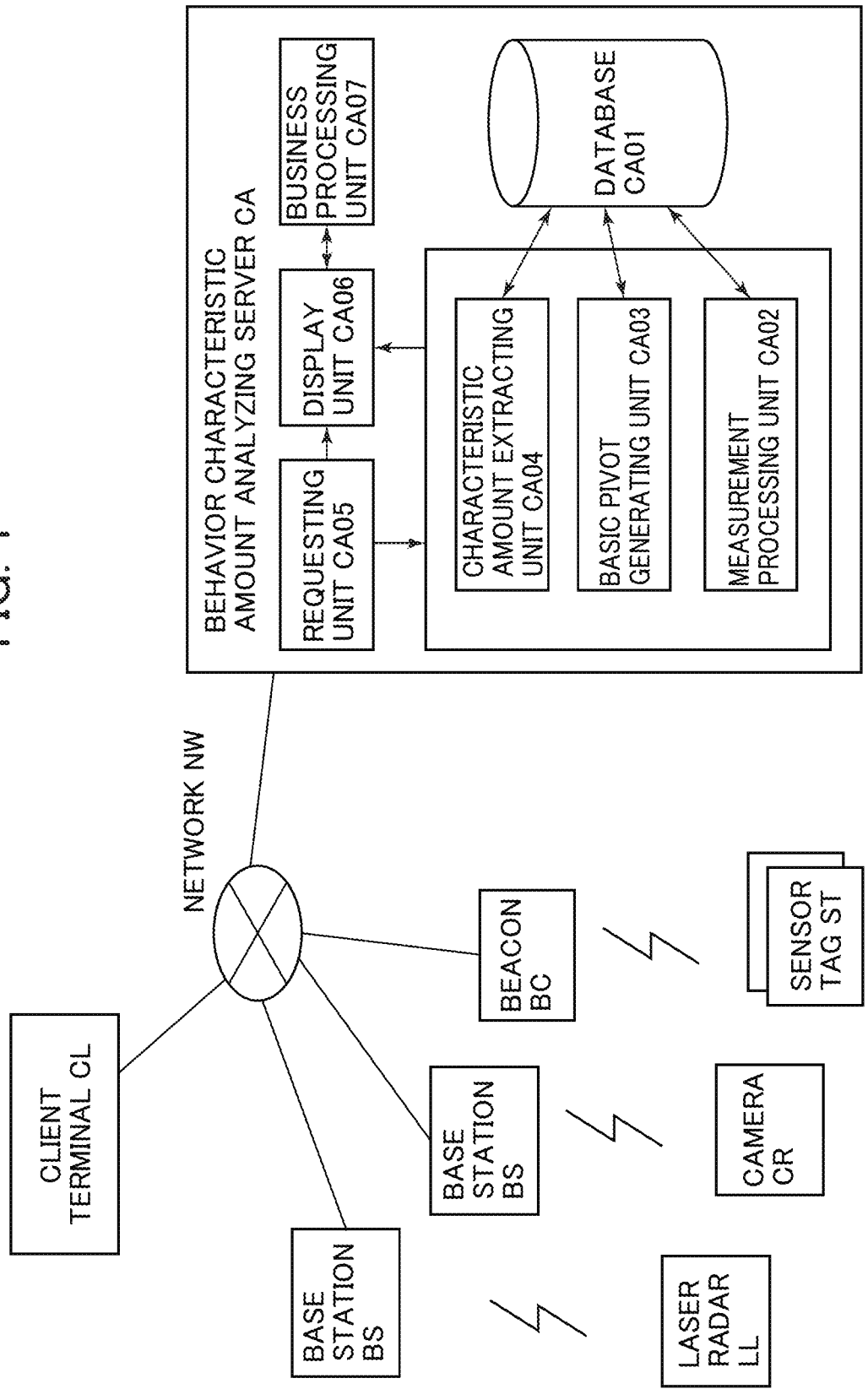
FIG. 1 is a diagram showing an entire configuration of a behavior characteristic amount analysis system.
Figures 2, 3:
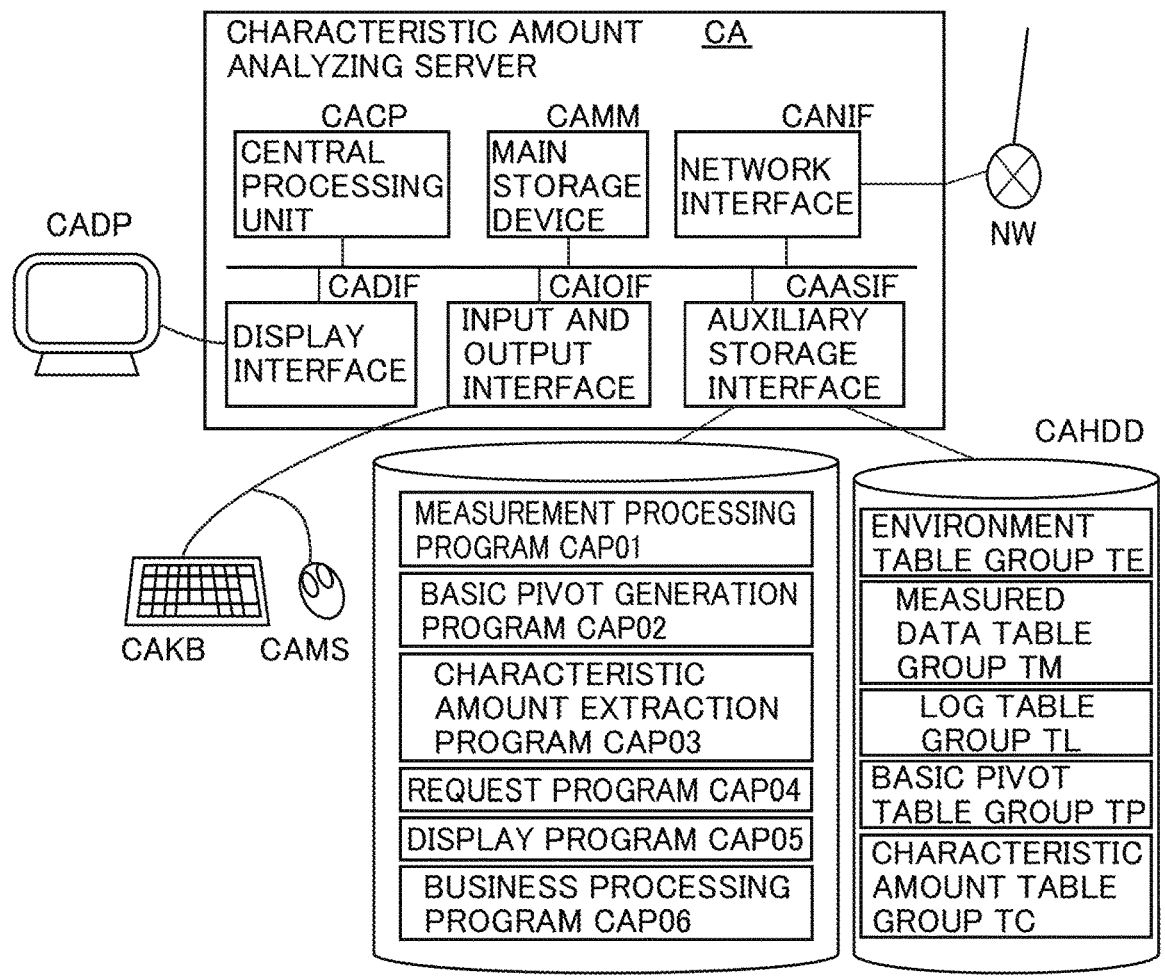
FIG. 2 is a diagram showing a hardware configuration and software configuration of a behavior characteristic amount analyzing server CA.
FIG. 3 is a diagram showing an example of a base station beacon installation table.

First, a configuration of the behavior characteristic amount analysis system is described using FIGS. 1 and 2.

As shown in FIG. 1, the behavior characteristic amount analysis system has a configuration in which a client terminal CL, a behavior characteristic amount analyzing server CA, base stations BS, and a beacon BC are connected to each other via a network NW.

The client terminal CL is connected to the behavior characteristic amount analyzing server CA via the network NW and is operated by a corporate manager US to use information output from the behavior characteristic amount analyzing server CA. The corporate manager US is a manager who confirms an area in which people stay in the facility and conforms how many people stay in the area in the facility. The corporate manager US is not necessarily limited to a real corporate manager and may be a person who operates the facility and is a manager, a facility manager, or the like, for example.

The network NW connects the client terminal CL to the behavior characteristic amount analyzing server CA, the base stations BS, and the beacon BC and communicates data. The base stations BS are devices that wirelessly collect measured information from a laser radar LL and a camera CR that are measuring devices for measuring people staying in the facility. In addition, the beacon BC is a device that holds information transmitted from sensor tags ST held by the people.

The behavior characteristic amount analyzing server CA is a server that performs a statistical process on sensor data, visualizes people staying in the facility, and generates data to be used to display data subjected to various statistical processes. The behavior characteristic amount analyzing server CA includes functional units, a database CA01, a measurement processing unit CA02, a basic pivot generating unit CA03, a characteristic amount extracting unit CA04, a requesting unit CA05, a display unit CA06, and a business processing unit CA07. The database CA01 holds data.

The database CA01 is a database that manages various types of data and tables to be used for data analysis by the behavior characteristic amount analyzing server CA. The various types of data and tables held in the database CA01 are described later in detail. The measurement processing unit CA02 receives sensor data from the base stations BS and performs measurement based on a predetermined measurement requirement. Extracted results are stored in a table of the database CA01. The basic pivot generating unit CA03 performs a process of calculating, based on the measurement performed by the measurement processing unit CA02, coordinates of a staying person and a characteristic amount related to the person. Extracted results are stored in a table of the database CA01. The characteristic amount extracting unit CA04 confirms whether or not concerned sensor data exists. If the concerned sensor data does not exist, the characteristic amount extracting unit CA04 uses the results obtained by the basic pivot generating unit CA03 to perform a process of calculating a characteristic amount approximating to a desired characteristic amount. Extracted results are stored in the database CA01.

The requesting unit CA05 transmits a request from the client terminal CL to each of the functional units. The display unit CA06 performs a process of extracting a characteristic amount necessary for display from results transmitted from the functional units and the database CA01 and performs a process of generating a display screen.

The business processing unit CA07 performs a process to coordinate with other business application software.

The client terminal CL receives data of the display screen generated by the display unit CA06 of the behavior characteristic amount analyzing server CA and displays the data in a display device. A user interface of the client terminal CL is described later in detail.

Next, a hardware configuration and software configuration of the behavior characteristic amount analyzing server CA are described using FIG. 2.

In the hardware configuration of the behavior characteristic amount analyzing server CA, a central processing unit (CPU) CACP shown in FIG. 2, a main storage device CAMM, a display interface CADIF, an input and output interface CAIOIF, a network interface CANIF, and an auxiliary storage interface CAASIF are connected to each other via a bus.

A monitor of an operational state and output results are displayed in the display device CADP. Input and output devices such as a keyboard CAKB and a mouse CAMS are connected to the input and output interface CAIOIF. The manager enters a command and the like using the input and output devices. The network NW such as a LAN or a WAN is connected to the network interface CANIF. Communication is performed with external devices such as the base stations BS and the client terminal CL via this interface. Storage devices such as a hard disk device CAHDD for storing data and a program and a solid state drive (SDD) are connected to the auxiliary storage interface CAASIF. The hard disk device CAHDD may be connected in an array and form a disk array in some cases.

An application program for a business process and an operating system (OS) are stored in the hard disk device CAHDD. In the case where the application program for the business process and the OS are executed, the application program for the business process and the OS are loaded into the main storage device CAMM and executed by the central processing unit CACP.

Especially, as programs to be executed as the behavior characteristic amount analyzing server CA, a measurement processing program CAP01, a basic pivot generation program CAP02, a characteristic amount extraction program CAP03, a request program CAP04, a display program CAP05, and a business process program CAP06 are installed. The measurement processing program CAP01, the basic pivot generation program CAP02, the characteristic amount extraction program CAP03, the request program CAP04, the display program CAP05, and the business process program CAP06 are programs for performing the functions, the measurement processing unit CA02, the basic pivot generating unit CA03, the characteristic amount extracting unit CA04, the requesting unit CA05, the display unit CA06, and the business processing unit CA07.

In addition, in the hard disk device CAHDD, various tables of the database CA01 are stored. The tables of the database CA01 are classified into table groups, an environmental table group TE, a measured data table group TM, a log table group TL, a basic pivot table group TP, and a characteristic amount table group TC. The various table groups and details thereof are described later in detail.

Next, a data structure used in the behavior characteristic amount analysis system is described using FIGS. 3 to 19.

The environment table group TE is a table group for storing information on a measurement environment of the system. A base station beacon installation table TE01 shown in FIG. 3 and a user information table TE02 belong to the environment table group TE.

The base station beacon installation table TE01 is a table in which information indicating where the base stations BS for measuring movements and trajectories of persons are installed is organized, as shown in FIG. 3.

Base station ID (TE011) indicates IDs identifying base stations. Type (TE012) indicates types of sensors used in the base stations. For example, the types are a laser radar, a camera, a stereo camera, a beacon, and the like. X coordinate (TE013) and Y coordinate (TE014) indicate X coordinates and Y coordinates of installed positions. The X coordinates and the Y coordinates correspond to values in a physical space. X-axis measurement range (TE015) and Y-axis measurement range (TE016) indicate ranges of X and Y axes in which the base stations are capable of performing measurement. Values of radii obtained in the case where the X coordinates (TE013) and the Y coordinates (TE014) are treated as centers are stored. The table shown in FIG. 3 is an example. If data necessary to manage base station information exists, the data can be added.

The user information table TE02 is a table for storing information of persons related to the sensor tags ST, as shown in FIG. 4. Specifically, since the sensor tags ST can be attached to the persons, respectively, the table holds attributes of the persons for analysis.

The measured data table group TM is a table group for holding information of measured data from the sensors. A sensor table (laser radar radar, sensor data) TM01 shown in FIG. 5, a sensor table (laser radar, trajectory data) TM02 shown in FIG. 6, a sensor table (camera, sensor data) TM03 shown in FIG. 7, a sensor table (camera, trajectory data) TM04 shown in FIG. 8, a sensor table (sensor tags, sensor data) TM05 shown in FIG. 9, and a sensor table (sensor tags, trajectory data) TM06 shown in FIG. 10 belong to the measured data table group TM. The tables of the measured data table group TM are hereinafter also referred to as sensor tables.

If data necessary to indicate a relationship between an object and a base station that detects the object exists, the data can be added to these sensor tables.

The sensor table (laser radar, sensor data) TM01 is a table for storing sensor data acquired from the laser radar, as shown in FIG. 5. Base station ID (TM011) indicates IDs of base stations that have transmitted sensor data. Time (TM012) indicates time when the sensor data has been received. X seat amount (TM013) and Y coordinate (TM014) are coordinate values of objects in the X and Y axes.

The sensor table (laser radar, trajectory data) TM02 is a table for storing results of extracting trajectories from the data stored in the sensor table TM01 of the laser radar, as shown in FIG. 6. Object ID (TM021) indicates IDs identifying objects. Line information of start points and end points is stored to indicate the trajectories using lines. Speed [m/s] (TM028) indicates attribute data of the objects and indicate values of speeds of the objects. Size [$m^2$] (TM029) indicates attribute data of the objects and indicate values of the sizes of the objects.

The sensor table (camera, sensor data) TM03 is a table for storing sensor data acquired from the camera CR, as shown in FIG. 7. Base station ID (TM031) indicates IDs of base stations that have transmitted sensor data. Time (TM032) indicates time when the sensor data has been received. Image (TM033) indicates images captured at the time (TM032).

The sensor table (camera, trajectory data) TM04 stores trajectories and results of image recognition from the data stored in the sensor table TM03 of the camera, as shown in FIG. 8. Object ID (TM041) indicates IDs identifying objects. Line information of start points and end points is stored to indicate the trajectories using lines. As information that can be acquired from the camera, not only the trajectories but also emotion, behaviors, age, belongings, and the like may be detected by performing an image recognition process on images captured by the camera CR and may be stored as shown in FIG. 8.

The sensor table (sensor tags, sensor data) TM05 is a table for storing sensor data acquired from the sensor tags ST, as shown in FIG. 9. Sensor tag ID (TM051) indicates IDs identifying sensor tags. Time (TM052) indicates time when the sensor data has been received. Multiple sensors are attached to the sensor tags ST. Data acquired by the sensors and indicating acceleration, temperatures, illuminance, and the like can be stored in the sensor tags ST. In addition, opposing surface (TM056) indicates sensor tag IDs of sensor tags ST held by persons that have approached.

The sensor table (sensor tags, trajectory data) TM06 stores trajectories and results of image recognition from the data stored in the sensor table TM05 of the sensor tags. Sensor tag ID (TM051) indicates IDs identifying sensor tags. Line information of start points and end points is stored to indicate the trajectories using lines. As information that can be acquired from the sensor tags ST, not only the trajectories but also other information such as speeds can be detected, as shown in FIG. 10.

The log table group TL is a table group for storing logs related to information of characteristic amounts stored in pivot tables. A characteristic amount information management table TL01 shown in FIG. 11 belongs to the log table group TL.

The characteristic amount information management table TL01 is a table for storing logs when characteristic amounts are generated from the sensor tables and stored in the pivot tables, as shown in FIG. 11. Management ID (TL01) indicates identifiers stored and to be used to manage the logs. Start time and date (TL02) and end time and date (TL03) indicate start time and dates of the generation of characteristic amounts in the pivot tables and end time and dates of the generation of the characteristic amounts in the pivot tables. Target start time and date (TL04) and target end time and date (TL05) indicate start time and dates of target sensor data and end time and dates of the target sensor data. Completed process range (TL06) indicates states of processes at the current time. Pivot ID (TL07) indicates stored pivot IDs of the pivot tables described later.

The basic pivot table group TP is a table group to which pivot tables storing information organized based on a certain perspective of view belong. A pivot table (person pivots) shown in FIG. 12, a pivot table (time pivots) shown in FIG. 13, a pivot table (location pivots) shown in FIG. 14, a pivot table (time and person pivots) shown in FIG. 15, a pivot table (location and person pivots) shown in FIG. 16, a pivot table (location and time pivots) shown in FIG. 17, and a pivot table (location, time, and person pivots) shown in FIG. 18 belong to the basic pivot table group TP. The tables of the basic pivot table group TP are hereinafter merely referred to as pivot tables or basic pivot tables.

In addition, characteristic amounts calculated by an approximation operation from characteristic amounts calculated from sensor tables (sensor data) and stored in the pivot tables are referred to as approximate characteristic amounts.

The pivot table (person pivots) TP01 is a table in which data of persons is mainly divided and stored and that aggregates sensor data for each person or for each attribute. Characteristic amounts of the persons can be calculated with combinations of multiple sensor data items. The table shown in FIG. 12 is an example. If data necessary to manage a person pivot exists, the data can be added.

The pivot table (time pivots) TP02 is a table in which data of time is mainly divided and stored and that aggregates sensor data for each unit of time, as shown in FIG. 13. Characteristic amounts of the time can be calculated with combinations of multiple sensor data items. The table shown in FIG. 13 is an example. If data necessary to manage a person pivot exists, the data can be added.

The pivot table (location pivots) TP03 is a table in which data of locations is mainly divided and stored and that aggregates sensor data for each unit area (mesh), as shown in FIG. 14. Characteristic amounts of the locations can be calculated with combinations of multiple sensor data items. The table shown in FIG. 14 is an example. If data necessary to manage a location pivot exists, the data can be added.

The pivot table (time and person pivots) TP04 is a table in which data of combinations of time and persons is mainly divided and stored and that aggregates data for each unit of time and for each person attribute, as shown in FIG. 15. Characteristic amounts of the time and the persons can be calculated with combinations of multiple sensor data items. The table shown in FIG. 15 is an example. If data necessary to manage time and person pivots exists, the data can be added.

The pivot table (location and person pivots) TP05 is a table in which data of combinations of locations and persons is mainly divided and stored and that aggregates data for each unit area (mesh) and for each person attribute. Characteristic amounts of the locations and the persons can be calculated with combinations of multiple sensor data items. The table shown in FIG. 16 is an example. If data necessary to manage location and person pivots exists, the data can be added.

The pivot table (location and time pivots) TP06 is a table in which data of combinations of locations and time is mainly divided and stored and that aggregates data for each unit area (mesh) and for each unit of time. Characteristic amounts of the locations and the time can be calculated with combinations of multiple sensor data items. The table shown in FIG. 17 is an example. If data necessary to manage location and time pivots exists, the data can be added.

The pivot table (location, time, and person pivots) TP07 is a table in which data of combinations of locations, time, and persons is mainly divided and stored and that aggregates data for each unit area (mesh), each unit of time, and each person attribute. Characteristic amounts of the locations, the time, and the persons can be calculated with combinations of multiple sensor data items. The table shown in FIG. 18 is an example. If data necessary to manage location, time, and person pivots exists, the data can be added.

The characteristic amount table group TC is a table group for storing results of editing characteristic amounts extracted from sensor data or the pivot tables. A characteristic amount table TC01 shown in FIG. 19 belongs to the characteristic amount table group TC.

The characteristic amount table TC01 is a table for storing results of editing characteristic amounts extracted from sensor data or the pivot tables, as shown in FIG. 19. The table shown in FIG. 19 is an example. If data necessary to manage a characteristic amount exists, the data can be added. Based on the characteristic amount table TC01, the display unit CA06 generates display data, and the display data is displayed on a display screen of the client terminal CL.

Next, processes of the behavior characteristic amount analysis system are described using FIGS. 20 to 24.

The embodiment describes a process of confirming how many people stay in the facility in which the corporate manager US stays and confirming states of the people staying in the facility.

First, as shown in FIG. 20, the base stations BS, the beacon BC, and the like collect data (hereinafter merely referred to as "sensor data") scanned by the camera CR, the laser radar LL, and the sensors such as the sensor tags ST (in S01).

Next, the measurement processing unit CA02 of the behavior characteristic amount analyzing server CA receives the sensor data from the base stations BS and the beacon BC, performs a process of measuring the sensor data (in S02), and performs registration in the database CA01 (in S03).

Next, the sensor data stored in the database CA01 is periodically extracted and the pivot tables are generated by the pivot generating unit CA03 (in S04), and the results thereof are registered in the database CA01 (in S05).

Next, the corporate manager US makes an entry in the client terminal CL and specifies a location at which a person to be confirmed by the corporate manager US stays in the facility, time when the person stays in the facility, a time period during which the person stays in the facility, and a characteristic amount of the person staying in the facility (in S06). Then, the specified results are transmitted to the requesting unit CA05 of the behavior characteristic amount analyzing server CA, and the requesting unit CA05 transfers necessary data to each of the functional units.

Next, the characteristic extracting unit CA04 receives a request, performs a process of extracting the characteristic amount (in S07), and registers the extracted result in the database CA01 (in S08).

Next, the display unit CA06 performs a process of generating display data of a display screen using the result transmitted from the characteristic amount extracting unit CA04 and a table included in the database CA01 and storing the characteristic amount necessary for display (in S09).

Then, the behavior characteristic amount analyzing server CA transmits the display data to the client terminal CL, and the display device of the client terminal CL displays the display data as a display screen (in S10).

Figure 21:
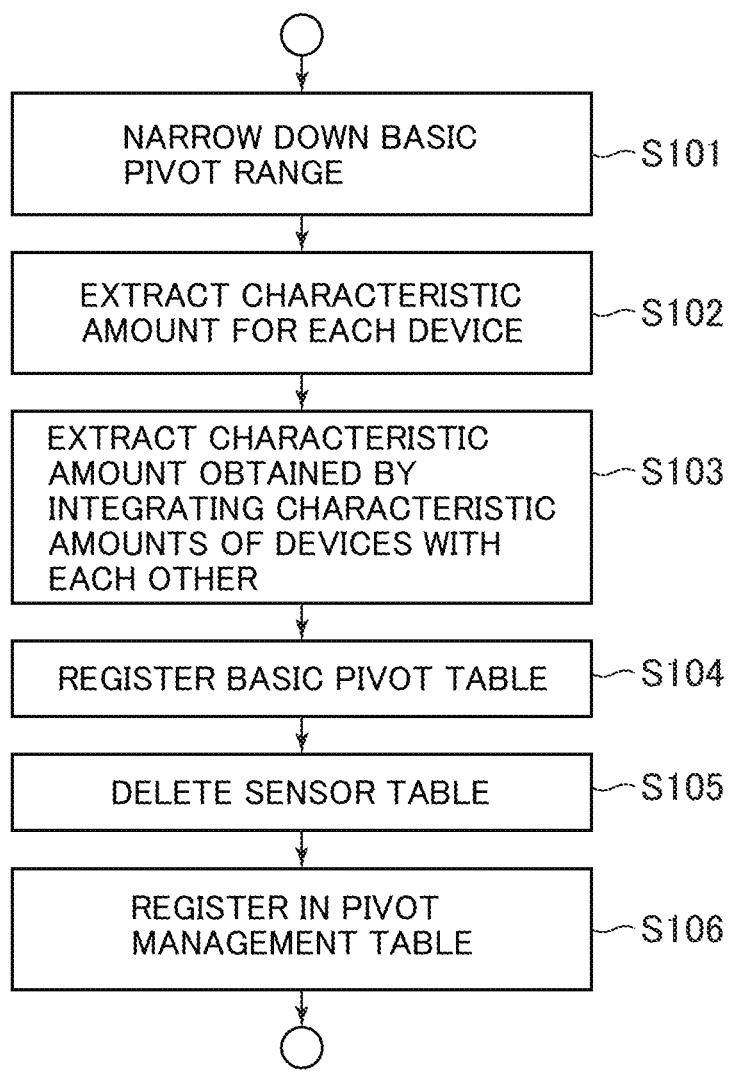
FIG. 21 is a flowchart showing a basic pivot table generation process.

Next, a basic pivot generation process by the basic pivot generating unit CA03 of the behavior characteristic amount analyzing server CA is described using FIG. 21.

The basic pivot generation is a process of generating a pivot table.

First, the basic pivot generating unit CA03 determines generation requirements (narrowing down of a basic pivot range) such as a time period for generating the pivot table and details of the pivot table (in S101)

Next, the basic pivot generating unit CA03 calculates a characteristic amount for each device (in S102).

Next, the characteristic amounts of the devices are integrated with each other to form a single characteristic amount (in S103). As a method for the integration, persons staying at the same point in trajectory data of the devices are treated as the same person, or persons whose trajectories of devices extend in the same direction or whose devices move at the same speed are treated as the same person.

Next, the pivot table generated based on the extraction of the characteristic amount obtained by integrating the characteristic amounts of the devices in S103 is registered in the database (in S104).

Next, sensor data included in the time period specified by the narrowing down of the basic pivot range in S101 is deleted (in S105).

Next, the requirements used for the narrowing down of the basic pivot range in S101, time when the process has been performed, and the like are registered in the pivot management table TL01 of the database CA01 (in S106).

Figure 22:
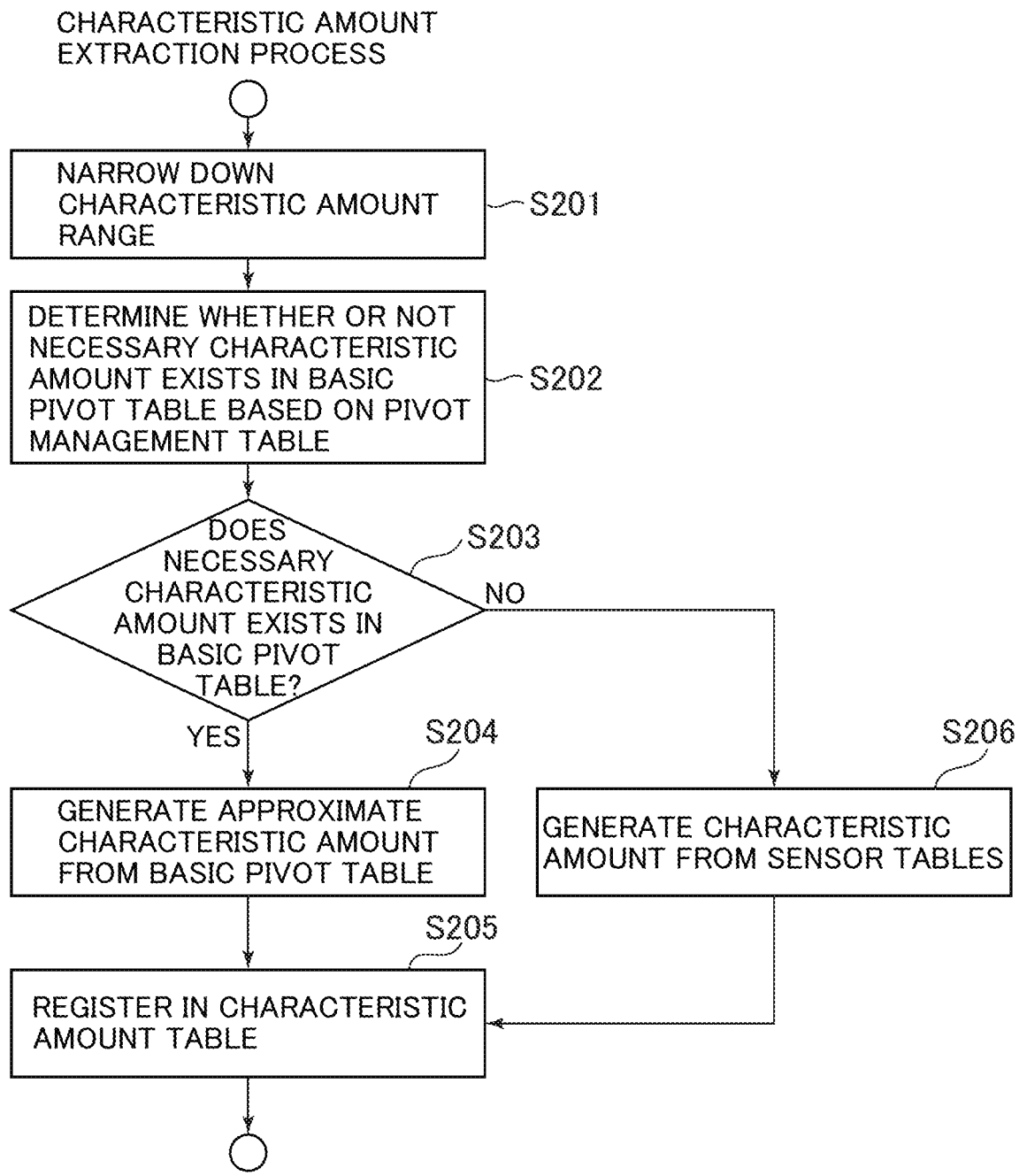
FIG. 22 is a flowchart showing a characteristic amount extraction process.

Next, the characteristic amount extraction process by the characteristic amount extracting unit CA04 of the behavior characteristic amount analyzing server CA is described using FIG. 22.

First, the characteristic amount extracting unit CA04 determines generation requirements such as a time period for generating a characteristic amount and a detail of the characteristic amount (in S201).

Next, whether or not the necessary characteristic amount exists in the pivot management table TL01 is determined (in S202). If it is determined that the necessary characteristic amount exists (YES in S203), an approximate characteristic amount is generated from the basic pivot table (in S204). If it is determined that the necessary characteristic amount does not exists (NO in S203), the characteristic amount is generated from the sensor tables (in S206).

Then, the result of obtaining the characteristic amount is registered in the characteristic amount table TL (in S205).

Figure 23:
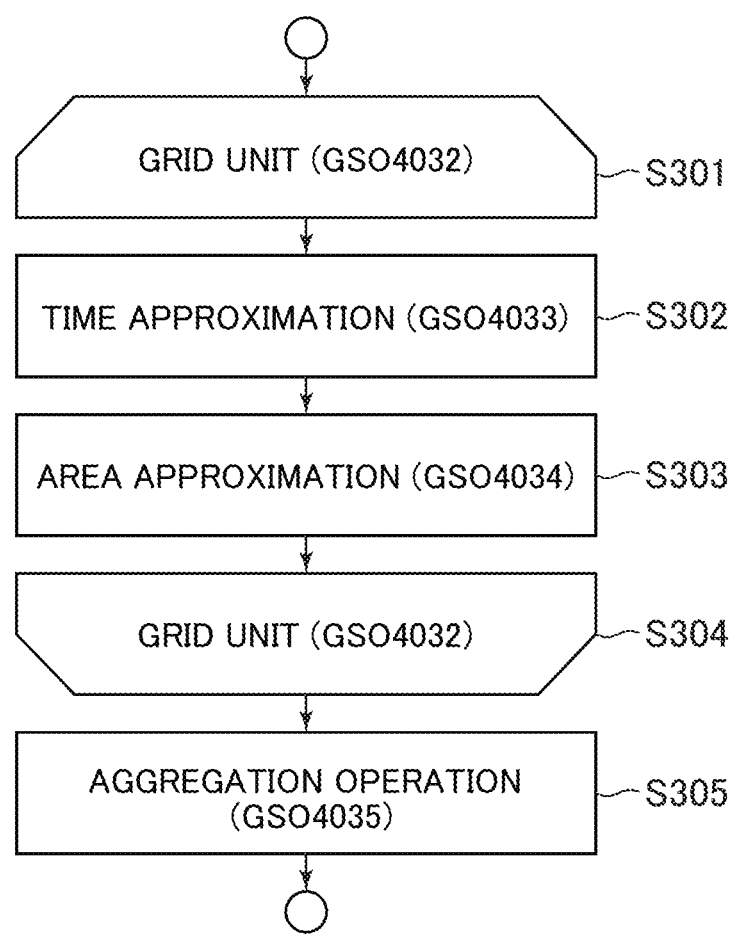
FIG. 23 is a flowchart of showing a process of generating an approximate characteristic amount from a basic pivot table.

Next, the process (in S203) of generating the approximate characteristic amount from the basic pivot table is described using FIGS. 23 and 24.

In this case, the facility to be measured is divided into grids, and a process of calculating the approximate characteristic amount on a grid basis and on measurement time basis is described below.

In the process of generating the approximate characteristic amount from the basic pivot table, time approximation (in S302) and area approximation (in S303) are performed on a grid basis (in a loop of S301 to S304).

For example, as shown in FIG. 24, an area for which a congestion rate is to be calculated and time to be analyzed are specified (for example, a triangular area of (a) at 9 o'clock 5 minutes) (in S401).

Next, a grid of the corresponding area and the corresponding time is acquired. In this case, it is assumed that congestion rates of grids of a range of the facility at 9:00 and 9:10 are indicated by (a) as data of the basic pivot table.

Then, time approximation is performed for each grid (in S404). Specifically, aggregation time is compared, and if the aggregation time is different, the congestion rate is calculated from linear approximation. For example, as indicated by (b), if a grid indicating a congestion rate of 0.5 at 9:00 changes to a grid indicating a congestion rate of 0.8 at 9:10, the linear approximation is performed to obtain an intermediate value that is 0.65 as the congestion rate.

Next, the area approximation (square approximation) is performed (in S405 and S406). Specifically, an overlapping rate of the concerned area and the grid is calculated, and a congestion rate of a concerned location is calculated from the congestion rate and the overlapping rate. For example, as indicated by (c), if the overlapping rate of the concerned grid and the concerned area is 0.4, the time-averaged congestion rate is 0.65, and the concerned congestion rate is indicated by x, the congestion rate can be calculated according to a proportional expression indicated by (d).

Then, an aggregation operation (arithmetic average) is performed to calculate the congestion rate of the concerned area (in S407).

Figure 25:
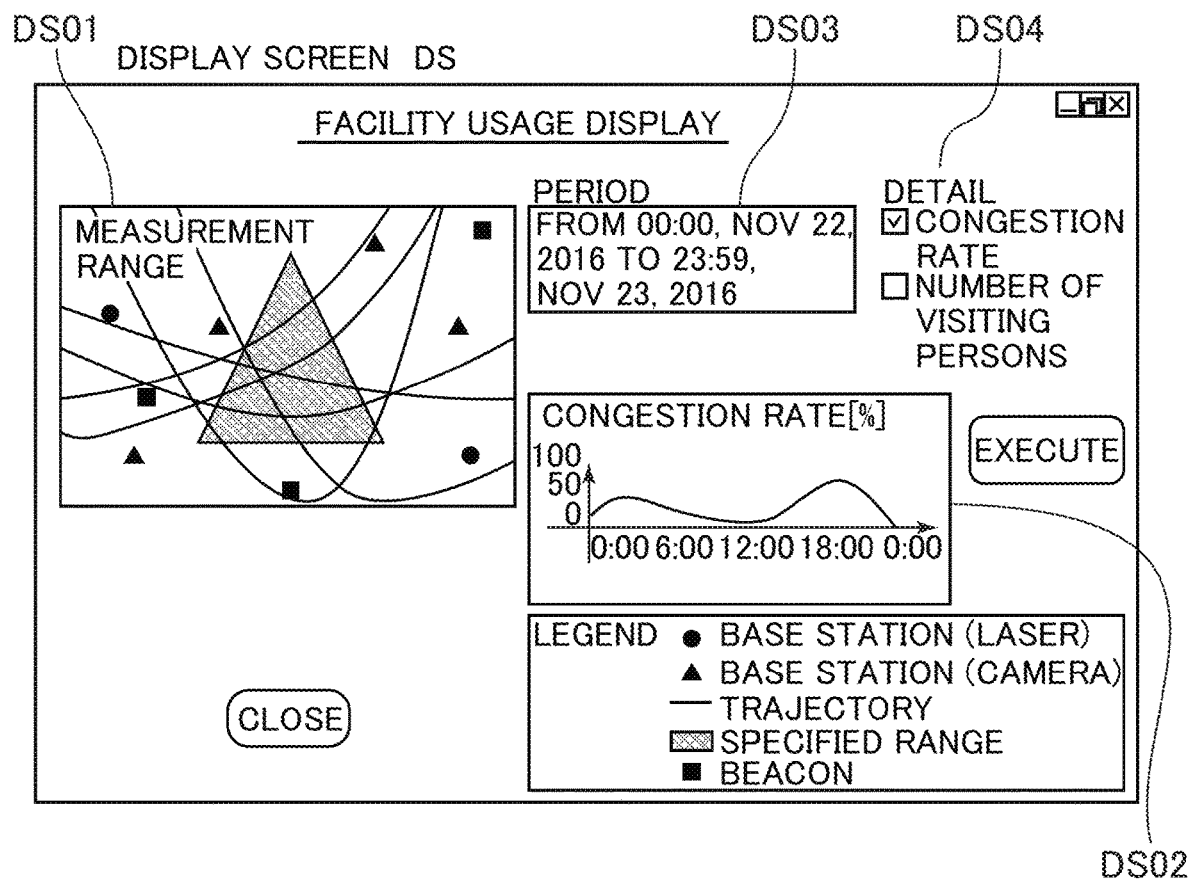
FIG. 25 is a diagram showing an example of a display screen for displaying results of behavior characteristic amounts.

Next, a display screen for displaying results of behavior characteristic amounts in the client terminal is described using FIG. 25.

FIG. 25 is a diagram showing an example of the display screen for displaying the results of the behavior characteristic amounts.

A display screen DS for displaying the results of the behavior characteristic amounts is composed of a facility range display space DS01, a congestion rate graph display space DS02, a time period display space DS03, a display target selection space DS04, and a legend display space DS05.

In the facility range display space DS01, the range of the facility is schematically displayed based on details indicated in the legend display space DS05. A specified range is a portion displayed as a triangle. For example, black circles indicate points at which the base stations BS performs the collection from the laser radar LL. In addition, curves indicated in the facility range display space DS01 indicate trajectories of observed persons.

In the congestion rate graph display space DS02, a change in the congestion rate over time is displayed as a graph. In the time period display space DS03, a time period during which a characteristic amount is calculated and data to be displayed in the facility range display space DS01 and the congestion rate display space DS02 is measured is indicated. The display target selection space DS04 is a space in which a characteristic amount to be displayed is selected. In the embodiment, the congestion rate is checked.

According to the embodiment, in the system for extracting information on persons based on measurement results of the measuring devices installed in an entire area to be measured, the requirements and output data upon the generation of the pivot tables from sensor data are initially held, and in the calculation of a next characteristic amount, a characteristic amount approximating to a desired characteristic amount can be calculated by processing a characteristic amount calculated in the past and stored in a pivot table. In addition, since the sensor data is deleted when the pivot tables are generated, the storage capacity can be saved and reduced.

In addition, in the embodiment, persons are treated as targets from which behavior characteristic amounts are measured. The targets, however, are not limited to this. The targets may be widely treated as moving objects and may be autonomous or heteronomous industrial robots or autonomous or heteronomous automatic guided vehicles (AGVs). If the targets from which behavior characteristic amounts are measured are industrial robots or automatic guided vehicles, it can be expected that the system is applied to production management in a factory.

LIST OF REFERENCE SIGNS

US . . . Manager, Client terminal CL, NW . . . Network, LL . . . Laser radar, ST Sensor tag, CR . . . Camera, BS . . . Base station, BC . . . Beacon, CA . . . Behavior characteristic amount analyzing server

The invention claimed is:

1. A behavior characteristic amount analysis system that analyzes sensor data input from a sensor and outputs a characteristic amount of a behavior related to a moving object, comprising a behavior characteristic amount analyzing server,
wherein the behavior characteristic amount analyzing server includes:
a central processing unit; and
a storage device,
wherein the storage device holds:
a sensor table group of sensor tables holding sensor data from the sensor; and
a pivot table of pivot tables aggregated based on the sensor table group and one or a combination of the moving object, time, and a location, and
wherein the central processing unit generates the pivot tables based on information of the sensor tables for each of predetermined time periods, causes the generated pivot tables to be stored in the storage device, and deletes the sensor tables used for the generation of the pivot tables.

2. The behavior characteristic amount analysis system according to claim 1, wherein the central processing unit calculates a behavior characteristic amount related to a behavior of the moving object from information stored in the pivot tables and causes the behavior characteristic amount to be stored as a characteristic amount table in the storage device.

3. The behavior characteristic amount analysis system according to claim 2, wherein the central processing unit performs linear approximation on the time, performs square approximation on the location, and calculates an approximate characteristic amount.

4. The behavior characteristic amount analysis system according to claim 1, wherein the moving object is any of a person, a robot, and an automatic guided vehicle.

5. A behavior characteristic amount analysis method in which a behavior characteristic amount analyzing server analyzes sensor data input from a sensor and outputs a characteristic amount of a behavior related to a moving object,
wherein the behavior characteristic amount analyzing server includes a central processing unit and a storage device,
wherein the method comprises:
a step of causing the central processing unit to generate a sensor table from the sensor data and cause the sensor table to be stored in the storage device;
a step of causing the central processing unit to generate a pivot table based on information of the sensor table for each of predetermined time periods and cause the generated pivot table to be stored in the storage device; and
a step of causing the central processing unit to delete the sensor table used for the generation of the pivot table from the storage device.

6. The behavior characteristic amount analysis method according to claim 5, further comprising causing the central processing unit to calculate a behavior characteristic amount related to a behavior of the moving object from information stored in the pivot table and cause the behavior characteristic amount to be stored as a characteristic amount table in the storage device.

7. The behavior characteristic amount analysis method according to claim 6, further comprising causing the central processing unit to perform linear approximation on time, perform square approximation on a location, and calculate an approximate characteristic amount.

8. The behavior characteristic amount analysis method according to claim 5, wherein the moving object is any of a person, a robot, and an automatic guided vehicle.

* * * * *